J. A. McGillivrae & C. O. Wheeler.
Hay & Cotton Press.
N°95707. Patented Oct. 12. 1869.
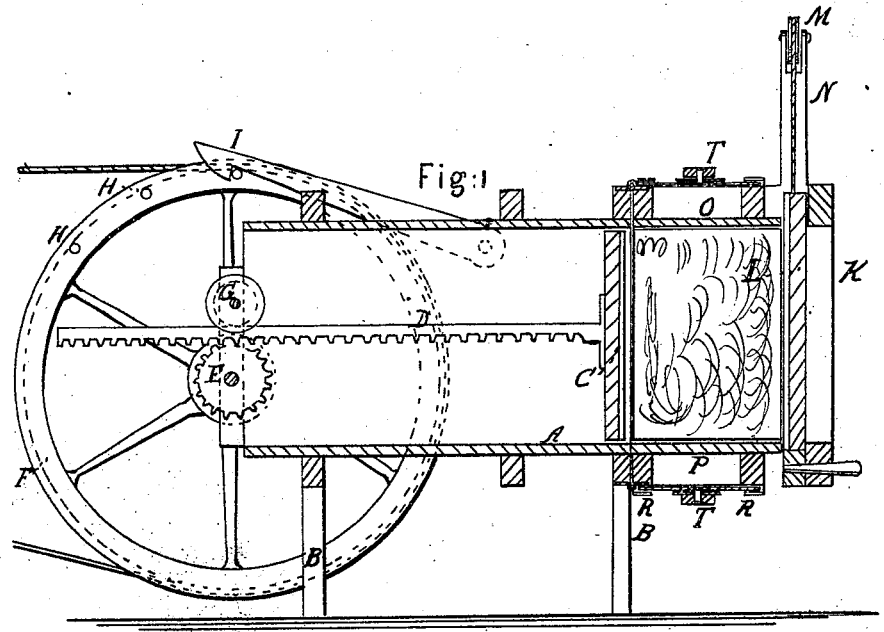
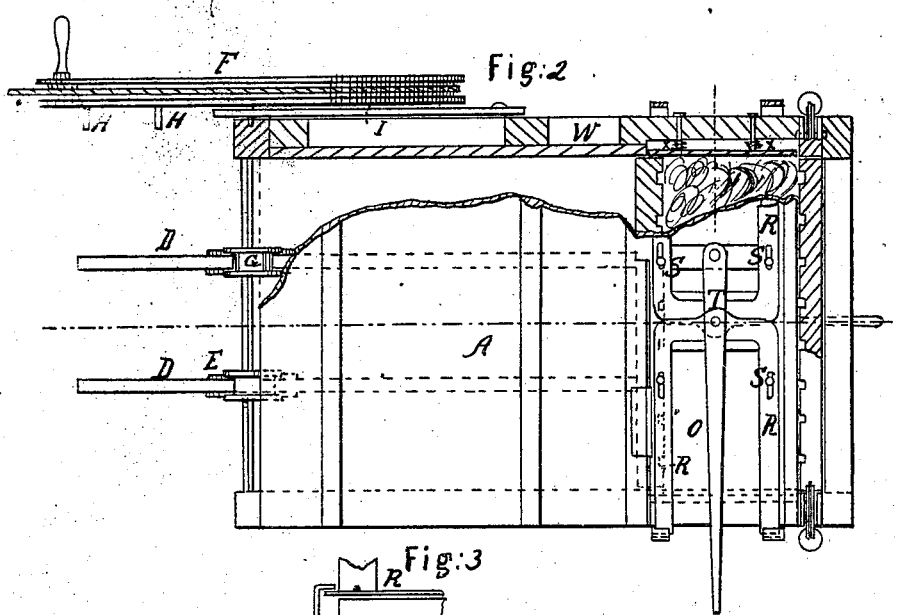
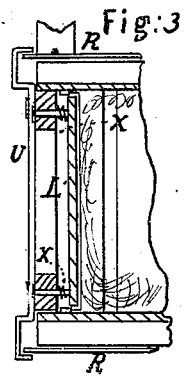
Witnesses:
Inventors:
J. A. McGillivrae
C. O. Wheeler
Per
Attorneys

United States Patent Office.

JAMES A. McGILLIVRAE AND C. O. WHEELER, OF MATTESON, ILLINOIS, ASSIGNORS TO C. O. WHEELER, OF SAME PLACE.

Letters Patent No. 95,707, dated October 12, 1869.

---

IMPROVEMENT IN HAY AND COTTON-PRESSES.

---

The Schedule referred to in these Letters Patent and making part of the same.

---

*To all whom it may concern:*

Be it known that we, JAMES A. McGILLIVRAE and C. O. WHEELER, of Matteson, in the county of Cook, and State of Illinois, have invented a new and improved Hay and Cotton-Press; and we do hereby declare that the following is a full, clear, and exact description thereof, which will enable others skilled in the art to make and use the same, reference being had to the accompanying drawings, forming part of this specification.

The object of this invention is to provide a portable press, for hay or cotton, of simple and cheap arrangement, and capable of being worked by hand.

The invention consists in the construction, arrangement, and combination of parts, as hereinafter described.

Figure 1 represents a longitudinal sectional elevation of our improved press;

Figure 2 represents a plan view, partly broken out; and

Figure 3 represents a section, taken on the line $y\,y$ of fig. 2.

Similar letters of reference indicate corresponding parts.

A represents a case or box, adapted in form to be placed on a wagon, for transportation; or it may, if preferred, be placed on legs B; but said legs are so arranged as to act as stakes when the case A is placed on a wagon-body or frame, the same entering staples in the sides thereof, thus preventing the lateral or longitudinal movement of the case. This construction also renders the movement of the case a matter of very little time or labor.

C represents the follower, arranged to be moved back and forth by rack-bars D, pinions E, and an operating-wheel, F, on the pinion-shaft.

These parts are designed to be placed at the front end of the wagon, with the operating-wheel F projecting outside of the wheel of the wagon.

Guide-rollers G are suitably placed above or at the back of the rack-bars, to keep them in place.

The operating-wheel F is provided with catch-pins H and a catch-pawl, I, for holding the follower up to the pressed bale while tying. Afterward, the catch I is disconnected, to turn the wheel back, for the withdrawal of the follower.

The case is filled through the rear end, at K, where a sliding door, L, is suspended by weighted cords M, working over guide-posts N, to be raised up, for filling, and closed down previous to pressing.

O and P represent hinged doors, opening, through the case, above and below the pressing-chamber. The pressed bale is discharged through the latter, behind the rear axle of the wagon.

These doors are fastened, while pressing, by the double vibrating catch-bars R, pivoted to the said covers, at S, and to a hand-lever, at T, whereby they are vibrated, to engage the ends of the said catch-bars with the bent catches U, at the sides of the case, running from top to bottom, and serving for the upper and lower catch-bars R, on the same side of the case.

These catch-bars are engaged with the catches, or disengaged from them, by the hand-levers.

V represents movable end walls, which we have provided for the ends of the chamber, into which the bale is pressed. These walls are designed to be coincident or parallel to the same plane with the walls W of the press before the pressing commences.

This provision of yielding end walls is one of the most important features of my invention. After receiving the amount of pressure necessary to compress it into the desired form, the bale in the other machines of this class can be removed only with great difficulty, owing to the binding of the same between the sides of the box. By my invention, after the bale has been tied, and the followers drawn back, the bale is easily taken out, or, as will usually be the case, falls to the ground without other aid than its own gravity.

Having thus described our invention,

What we claim as new, and desire to secure by Letters Patent, is—

1. The combination of a vertically-sliding entrance-door, L, hinged upper and lower doors O P, to admit of a quick and easy discharge of the pressed bale, and the yielding end walls, all constructed and fitted together as described, to form an improved bale-pressing box.

2. The subject-matter of first clause, in combination with an oblong rectangular case or box, A, and a horizontal plunger, all as shown and described.

3. The arrangement, with the case A, of the yielding end walls V, substantially as specified.

J. A. McGILLIVRAE.
C. O. WHEELER.

Witnesses:
S. MARSH,
PATRICK HEALION.